UNITED STATES PATENT OFFICE.

FREDERICK WILLIAM MARTINO AND FREDERIC STUBBS, OF SHEFFIELD, ENGLAND.

PROCESS OF PRECIPITATING GOLD FROM CHLORID OR BROMID SOLUTIONS.

SPECIFICATION forming part of Letters Patent No. 637,140, dated November 14, 1899.

Application filed March 20, 1899. Serial No. 709,835. (No specimens.)

*To all whom it may concern:*

Be it known that we, FREDERICK WILLIAM MARTINO and FREDERIC STUBBS, subjects of the Queen of England, residing at Sheffield, England, have invented certain new and useful Improvements in or Relating to the Precipitation of Gold from Chlorid or Bromid Solutions Containing It, (for which application for patent has been made in England, No. 5,034, dated March 7, 1899,) of which the following is a specification.

This invention relates to improvements in the precipitation of gold from chlorid or bromid solutions containing it, the solutions referred to being such as are produced in the well-known "chlorination" process and the less-known "permanganate" and "bromid" processes.

Under the phrase "permanganate process" are included the various methods by which gold is extracted from its ores by the use of permanganates or manganates of potash or soda. The details of these processes form no part of the present invention, and it is sufficient to say that the gold-containing solutions obtained by them are usually chlorid solutions.

The essential feature of this invention is the employment for precipitating gold from the above-mentioned solutions of metallic carbids, which when brought into contact with water produce a hydrocarbon gas, or the employment of such hydrocarbon gases however they may be manufactured.

Carbids of the metals of the alkaline earths—calcium and barium carbids, for instance—produce acetylene when treated with water, and methane is produced in a similar manner from aluminium carbid.

In the following specification the terms "metallic carbid" and "hydrocarbon gas" are to be understood as referring, respectively, to the carbids and gases above mentioned.

In carrying out this invention a hydrocarbon gas is passed through a chlorid or bromid solution containing gold or a metallic carbid is added to the liquid, thus producing a nascent hydrocarbon gas. In either case the chlorid or bromid of gold is decomposed and the metal precipitated.

If the chlorid or bromid solution contains free chlorin or free bromin, it may be found advisable before treating the solution by the method herein described to remove the excess of chlorin or bromin by any convenient process, preferably by passing a current of air through the solution, in order to avoid the waste of metallic carbid or hydrocarbon gas, which is necessary to neutralize these elements before precipitation commences.

In the permanganate process the small quantity of permanganate present in the solution of auric chlorid is immediately decomposed by the metallic carbid or hydrocarbon gas, and precipitation of gold then proceeds rapidly.

Heat from any outside source may, if desired, be applied during any of the stages constituting this improved process.

The following are the probable chemical reactions which take place according to this invention when—

(*a*) Acetylene is passed through a solution containing chlorid of gold:

$$2AuCl_3 + 3C_2H_2 = Au_2 + 3C_2H_2Cl_2.$$

(*b*) Acetylene is passed through a solution containing bromid of gold:

$$4AuBr_3 + 3C_2H_2 = Au_4 + 3C_2H_2Br_4.$$

(*c*) Calcium carbid is added to a solution containing chlorid of gold:

$$2AuCl_3 + 3CaC_2 + 3H_2O = Au_2 + 3CaO + 3C_2H_2Cl_2.$$

(*d*) Calcium carbid is added to a solution containing bromid of gold:

$$4AuBr_3 + 3CaC_2 + 3H_2O = Au_4 + 3CaO + 3C_2H_2Br_4.$$

It is to be understood that acetylene and calcium carbid are merely given as convenient examples of the hydrocarbon gases and the metallic carbids referred to in the specification.

Having now particularly described and ascertained the nature of this invention and in what manner the same is to be performed, we declare that what we claim is—

1. The process for the precipitation of gold from aqueous chlorid or bromid solutions, consisting in treating such solutions with a hydrocarbon gas such as is produced when a metallic carbid is decomposed by water.

2. In a process for the precipitation of gold from aqueous chlorid or bromid solutions by treating such solutions with a hydrocarbon gas such as is produced when a metallic carbid decomposable by water is decomposed by water, the addition of a metallic carbid to the chlorid or bromid solution to produce the hydrocarbon gas in a nascent condition.

In witness whereof we have hereto set our hands in the presence of the two subscribing witnesses.

FREDERICK WILLIAM MARTINO.
FREDERIC STUBBS.

Witnesses:
THOMAS HARVEY,
JOSEPH BRIGHT.